Figure 1:
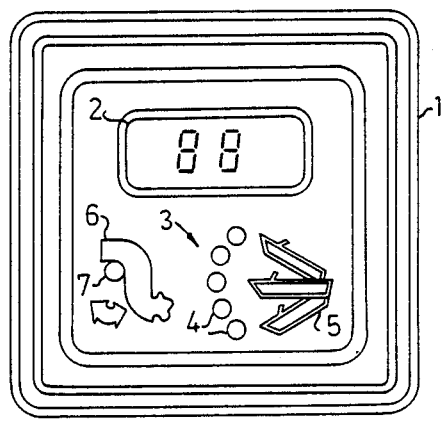

United States Patent [19]

Borgersen

[11] Patent Number: 4,652,878
[45] Date of Patent: Mar. 24, 1987

[54] TRIM INDICATOR FOR BOATS WITH OUTBOARD PROPELLER DRIVE UNITS

[75] Inventor: Kjell Borgersen, Hjälteby, Sweden

[73] Assignee: AB Volvo Penta, Goteborg, Sweden

[21] Appl. No.: 651,847

[22] Filed: Sep. 18, 1984

[30] Foreign Application Priority Data

Sep. 20, 1983 [SE] Sweden ............................ 8305059

[51] Int. Cl.⁴ ................................................ B63J 5/00
[52] U.S. Cl. ............................... 340/984; 73/178 R; 340/689; 440/2; 440/53
[58] Field of Search .................... 340/984, 987, 689; 73/178 R, 181; 440/2, 53, 113; 114/285, 32, 280, 137, 185, 270; 116/26

[56] References Cited

U.S. PATENT DOCUMENTS

| | | |
|---|---|---|
| 3,116,711 | 1/1964 | Hardesty . |
| 3,601,082 | 8/1971 | Wise ......................................... 440/2 |
| 3,844,247 | 10/1974 | Collis et al. ............................. 440/2 |
| 3,929,089 | 12/1975 | Lambrecht et al. ..................... 440/2 |
| 3,931,784 | 1/1976 | Collis et al. .............................. 440/2 |
| 4,005,674 | 2/1977 | Davis ....................................... 440/2 |
| 4,340,936 | 7/1982 | Mounce ................................ 340/984 |
| 4,420,741 | 12/1983 | West ..................................... 340/984 |
| 4,459,115 | 7/1984 | Ballard ................................. 340/689 |
| 4,493,656 | 1/1985 | Inoue et al. .......................... 340/689 |

FOREIGN PATENT DOCUMENTS 427101 3/1983 Sweden .

Primary Examiner—James L. Rowland
Assistant Examiner—Brent A. Swarthout
Attorney, Agent, or Firm—Young & Thompson

[57] ABSTRACT

An indicator instrument for boats with outboard drive units which can be adjusted to various angles in relation to the transom and which has an indicator, preferably an LCD which shows the angle of the drive unit within the entire adjustment range, and an indicator, preferably an LED stack, which provides a rough indication of the drive unit setting within the trim angle range.

5 Claims, 2 Drawing Figures

TRIM INDICATOR FOR BOATS WITH OUTBOARD PROPELLER DRIVE UNITS

The present invention relates to an indicator instrument for boats with an outboard drive unit which can be adjusted to various angles in relation to the transom of the boat and has a sensor designed to send to the instrument an electrical signal dependent on said adjustment angle, said instrument being provided with indicator means for indicating said angle within the entire adjustment range of the drive unit.

Previously known instruments of this type indicate the angular setting of the drive unit by analog means with a pointer on a scale which covers the entire adjustment range of the drive unit. The scale can be colored to facilitate reading. For example, the scale can be green within the trim range and red outside this range. The problem is however that the trim range varies for different outboard drive units and different boats, which can also be more or less sensitive to trimming. The trim range markings are thus only of help in those cases where the markings happen to agree with the actual trim range of the boat. In all other cases, the operator must keep in mind the boat's actual trim range and disregard the trim range markings on the instrument when the drive unit is trimmed. The trim range markings are in these cases only misleading and it is quite possible that the operator will still tend to trim the drive unit within the range marked on the instrument.

The purpose of the present invention is to produce an indicator instrument of the type described by way of introduction, in which the disadvantage of the above-mentioned known instruments is eliminated.

This is achieved according to the invention by virtue of the fact that the instrument has a second indicator means for indicating angular intervals within a limited angular range within the adjustment range, means being provided for manual selection of one of a plurality of limited angular ranges.

In a particularly advantageous embodiment of the instrument according to the invention, the instrument comprises a microprocessor in which said plurality of limited angular ranges are programmed, a switch for selection of angular range, a window for digital indication of the adjustment angle within the entire adjustment range of the drive unit, and a stack of light emitting diodes for indicating the angular interval within the selected limited angular range.

The invention is based in principle on the idea of separating range indication and angle indication from each other in order to make it possible when installing the instrument to select and set a trim range for the instrument which agrees with the actual range for the drive unit and boat in each individual case. As previously, the first indicator displays—preferably digitally for more accurate reading—the angular setting of the drive unit. This indicator does not however provide any information concerning within which of the ranges trim, beach, or tilt, this angle lies. This information is obtained instead from the second indicator. The invention thus provides an instrument which clearly and unambigously provides all the required information in a manner which is quite easy to grasp and easily read if the digital angle indication is combined with LED-indication of the trim range.

Figure 2:
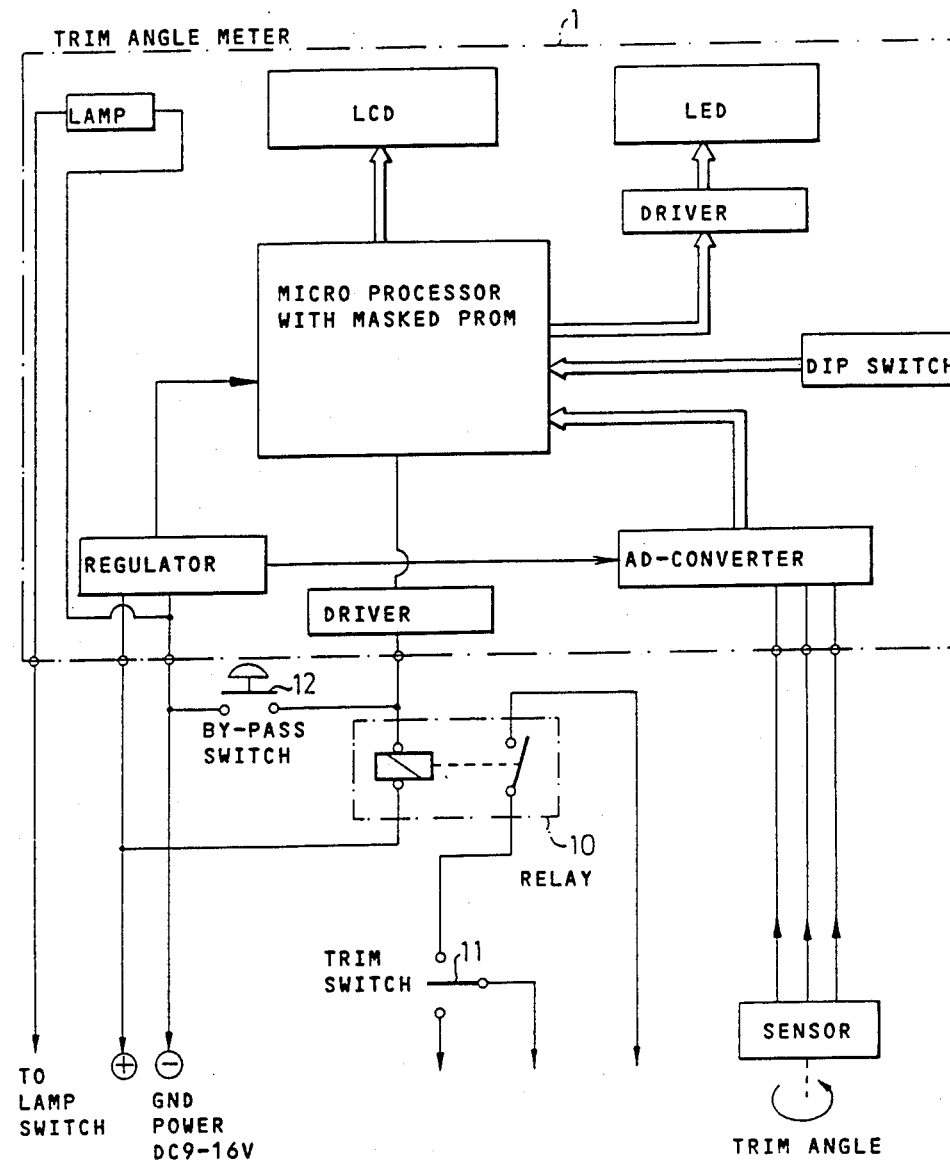

The invention will be described in more detail below with reference to an example shown in the accompanying drawings, of which FIG. 1 shows a front view of an instrument according to the invention, and FIG. 2 shows a block diagram of the instrument.

The instrument has a housing 1, for flush mounting in an instrument panel for example. The housing contains the required electrical components for the indications given below and is provided on its back with connections for electric current and for an angle sensor on the drive unit.

On the front of the instrument there is an indicator window 2 in which the angle of the drive unit in relation to a reference plane transverse to the boat is indicated digitally with liquid crystals. Beneath the window 2 there is an LED stack 3 consisting of five LEDs 4 arranged beside a symbol 5 which depicts the cruising attitude of the boat at various trim angles. The stack 3 and the symbol 5 thus provide a rough indication of the trim angle. To one side of the trim indicator there is another indicator consisting of a drive unit symbol 6 and an LED 7 placed at the tip joint.

These two last-mentioned indicators provide information telling in which of the three ranges the angle shown on the digital indicator lies. The three ranges are:

(1) The trim range, i.e. the angular range for the outboard unit for operation at speeds above the low-speed range;

(2) The beach range, i.e. the angular range for the outboard unit for operation at low speeds when passing obstacles such as sand bars, rocks etc.;

(3) The tilt range, i.e. the angular range for the outboard unit within which the propeller housing is completely or almost completely lifted out of the water.

As long as the drive unit angle is within the trim range, one or more of the LEDs 4 will be lighted depending on the trim angle. When the drive unit is trimmed outside the trim range and into the beach range, LED 7 is lit and gives a steady light as long as the angle lies within the beach range. When it is tilted into the tilt range, LED 7 will flash.

According to the invention, the instrument is designed so that it can be set for various trim ranges. The table below relates to an embodiment in which one of four trim ranges can be selected with the aid of a switch. The table shows the angular interval for each LED 4 in the stack 3 and the angle at which LED 7 starts to give off a steady light.

| | DIP switch position | | | |
| --- | --- | --- | --- | --- |
| | 4 | 3 | 2 | 1 |
| | Trim limit | | | |
| LED No. | 6° | 8° | 12° | 16° |
| 4:1 | −4°, −3° | −4°, −3° | −4°~−2° | −4°~−1° |
| 4:2 | −2°, −1° | −2°~0° | −1°~1° | 0°~3° |
| 4:3 | 0°, 1° | 1°, 2° | 2°~4° | 4°~7° |
| 4:4 | 2°, 3° | 3°~5° | 5°~7° | 8°~11° |
| 4:5 | 4°, 5° | 6°, 7° | 8°~11° | 12°~15° |
| 7 | above 6° | above 8° | above 12° | above 16° |

As shown in the block diagram in FIG. 2, the instrument includes a microprocessor in which the above trim angle ranges are programmed. The desired range is selected by a DIP switch on the back of the instrument. The total indication range is in the example −6° to +63°. The limit of the tilt range, at which LED 7 changes from a steady to a flashing light, is at 45°.

In addition to electric current connections, connections for a trim angle sensor and a connection for a lamp switch, the instrument has a connector for a relay 10 designed to control electro-hydraulic equipment for adjusting the trim angle. Within the trim range, the relay is turned on and off by means of a manual switch 11. At the trim limit given in the above table, the instrument cuts off the current to the relay however. If the drive unit is then to be trimmed out further, then a switch 12 must be actuated simultaneously with the switch 11. There is thus no risk that the drive unit will be unintentionally trimmed into the beach range or the tilt range.

What I claim is:

1. Indicator instrument for a boat with an outboard drive unit, said unit being adjustable to various angles in relation to the transom of the boat and having a sensor designed to send to the instrument an electrical signal dependent on said various angles, said various angles being within an entire adjustment range for the drive unit, said instrument comprising: first indicator means for indicating said various angles within the entire adjustment range of the drive unit; second indicator means for indicating angular intervals within a limited angular range within said adjustment range; and means for the manual selection of one of a plurality of limited angular ranges, said second indicator means indicating angular intervals within said selected one limited angular range only when said angle of said drive unit lies within said selected one range.

2. Indicator instrument according to claim 1, further comprising a third indicator means for indicating that the drive unit has been adjusted to be outside the angular range of a limited range.

3. Indicator instrument according to claim 1, further comprising means arranged to control current supply to an output to which electrical operating means for adjusting the drive unit angle are connectable, and characterized in that the supply of current to the output is shut off when the drive unit angle reaches the upper limit within one of said limited angular ranges.

4. Indicator instrument according to claim 1, further comprising a microprocessor in which said plurality of limited angular ranges are programmed; a switch for selection of angular range; a window containing a liquid crystal display for digital indication of the adjustment angle within the entire adjustment range of the drive unit; and a plurality of vertically spaced light emitting diodes for indicating an angular interval within the selected limited angular range, such that said display and said diodes are connected to output ports of the microprocessor.

5. Indicator instrument according to claim 2, characterized in that said third indicator means is a light emitting diode.

* * * * *